(12) United States Patent
Huo et al.

(10) Patent No.: US 11,074,422 B2
(45) Date of Patent: Jul. 27, 2021

(54) LOCATION DETERMINATION WITHOUT ACCESS TO A NETWORK

(71) Applicant: International Business Machines Corporation, Armonk, NY (US)

(72) Inventors: Zhan Peng Huo, Beijing (CN); Wen Ji Huang, Beijing (CN); Wen Bin Han, Beijing (CN); Xue Yong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/238,691

(22) Filed: Jan. 3, 2019

(65) Prior Publication Data

US 2020/0218863 A1  Jul. 9, 2020

(51) Int. Cl.
*G06K 7/14* (2006.01)
*G01C 21/20* (2006.01)
*G06K 7/10* (2006.01)

(52) U.S. Cl.
CPC ......... *G06K 7/1417* (2013.01); *G01C 21/206* (2013.01); *G06K 7/10722* (2013.01); *G06K 7/1413* (2013.01)

(58) Field of Classification Search
CPC .... G01C 21/206; G01C 21/1656; G06K 7/00; G06K 7/10; G06K 7/10544; G06K 7/1417; H04W 4/02; H04W 4/024; H04W 4/025; H04W 4/029; H04W 64/00
See application file for complete search history.

(56) References Cited

U.S. PATENT DOCUMENTS

| 9,303,986 | B2 | 5/2016 | Waters et al. |
| 9,462,423 | B1 | 10/2016 | Rivlin et al. |
| 9,506,761 | B2 | 11/2016 | Chen et al. |
| 2006/0125644 | A1* | 6/2006 | Sharp ............... G01S 5/0263 340/573.1 |
| 2013/0211718 | A1 | 8/2013 | Yoo et al. |

(Continued)

FOREIGN PATENT DOCUMENTS

| CN | 105160928 A | 12/2015 |
| CN | 105783914 A | 7/2016 |

OTHER PUBLICATIONS

Ambareesh et al., "Navigation for Indoor Location Based on QR Codes and Google Maps—a Survey," International Journal of Innovative Research in Information Security (IJIRIS), May 2017, Issue 05, vol. 04, pp. 43-48.

(Continued)

*Primary Examiner* — Thien M Le
*Assistant Examiner* — April A Taylor
(74) *Attorney, Agent, or Firm* — Yee & Associates, P.C.

(57) ABSTRACT

Methods, systems, and devices for determining a person's location and for presenting navigation instructions are provided. In an embodiment, a method for determining a user's location includes obtaining an image of a graphical indicator at a first location. The graphical indicator is located on a surface of an object in an area and the graphical indicator includes mapping and location information encoded in the graphical indicator. The method also includes determining a map and a user's location on the map according to the graphical indicator.

20 Claims, 6 Drawing Sheets

(56) References Cited

U.S. PATENT DOCUMENTS

| | | | | |
|---|---|---|---|---|
| 2014/0163868 A1* | 6/2014 | Huang | ................. | G01C 21/206 |
| | | | | 701/425 |
| 2014/0209671 A1* | 7/2014 | Finlow-Bates | ...... | G06K 7/1417 |
| | | | | 235/375 |
| 2014/0274122 A1* | 9/2014 | Tseng | .................... | G01S 5/0263 |
| | | | | 455/456.1 |
| 2015/0153181 A1 | 6/2015 | Gildfind et al. | | |
| 2016/0328784 A1* | 11/2016 | Jones | ................. | G06Q 30/0639 |
| 2016/0345137 A1 | 11/2016 | Ruiz | | |
| 2018/0350093 A1* | 12/2018 | Sweet | ................... | G01C 21/206 |
| 2019/0234740 A1* | 8/2019 | Gabbay | .............. | G01C 21/3652 |
| 2020/0286255 A1* | 9/2020 | Tatarnikov | ......... | G06K 9/00791 |

OTHER PUBLICATIONS

Ilkovicova et al., "Positioning in Ind000r Environment Using QR Codes," INGEO—6th International Conference on Engineering Surveying, Prague, Czech Republic, Apr. 3-4, 2014, pp. 117-122.

Panzieri et al.; "Simultaneous Localization and Map Building Algorithm for Real-Time Applications"; Elsevier IFAC Publications; 2005; 6 pgs.

Gule et al., "A Survey—QR Code Based Navigation System for Closed Building Using Smart Phones," International Journal for Research in Applied Science and Engineering Technology (IJRASET), Apr. 2014, vol. 2, Issue IV, pp. 42-445.

* cited by examiner

LOCATION DETERMINATION WITHOUT ACCESS TO A NETWORK

BACKGROUND

The disclosure relates generally to location determination and more specifically to location determination by a data processing system unaided by network connectivity.

When traveling to a place that is unfamiliar, it is quite easy to get lost. For example, if someone is in a large building such as a museum or mansion, that person may walk back and forth through the same areas trying to figure out how to get to a particular room, but be unable to find it. As another example, when parking in a large parking underground parking structure, it may be difficult for an individual to find their car and they may spend a great deal of extra time trying to find their car. Many times, wireless Internet access in such places is either non-existent or the signal is too weak to be able to connect. Thus, using their wireless device to locate and map the way through the museum, mansion, or parking garage is not feasible. Furthermore, even when wireless Internet access is available, the user may not know how to obtain a map of the particular structure within which the user is located and, therefore, be unable to make use of the Internet connection in navigating the building.

SUMMARY

According to one embodiment of the present invention, a method for determining a user's location includes obtaining an image of a graphical indicator at a first location. The graphical indicator is located on a surface of an object in an area and the graphical indicator includes mapping and location information encoded in the graphical indicator. The method also includes determining a map and a user location on the map according to the graphical indicator.

According to another embodiment of the present invention, a computer for determining a user's location unaided by a network connection includes a processor and a non-transitory computer readable storage medium storing program code which, when executed by the processor, performs a computer-implemented method of using the computer to determine a user's location unaided by a network connection. The program code includes program code for obtaining an image of a graphical indicator at a first location, the graphical indicator located on a surface of an object in an area, and the graphical indicator including mapping and location information encoded in the graphical indicator. The program code also includes program code for determining a map and a user location on the map according to the graphical indicator.

According to another embodiment of the present invention, a computer program product for determining a user's location unaided by a network connection includes a non-transitory computer readable storage medium storing program code which, when executed by a processor, causes the processor to perform a computer-implemented method to determine a user's location unaided by a network connection. The program code includes program code for obtaining an image of a graphical indicator at a first location, the graphical indicator located on a surface of an object in an area, and the graphical indicator including mapping and location information encoded in the graphical indicator. The program code also includes program code for determining a map and a user location on the map according to the graphical indicator.

DETAILED DESCRIPTION

Figure 1:
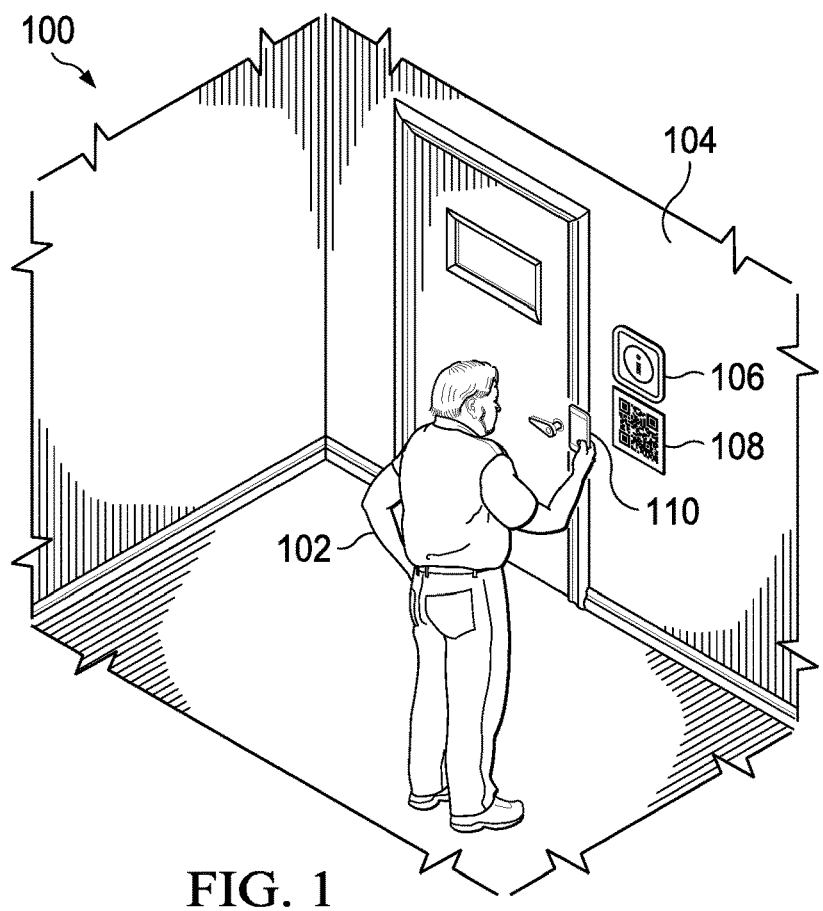
FIG. 1 is a diagram of an environment in which a user needs directions to a location within a building in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, "a number of" when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

It would be desirable to have a method and apparatus that take into account at least some of the issues discussed above, as well as other possible issues. For example, it would be desirable to have a method and apparatus that overcome a technical problem with determining one's location when wireless Internet connectivity or the GPS (Global Positioning System) is unavailable.

Hence, disclosed herein are methods, systems, and devices for determining a user's location and for determining a map and navigation directions to a user's desired destination without access to the Internet or a network. In an embodiment, a Quick Response (QR) codes or some other graphical indicator are placed on surfaces in various locations distributed throughout an area, such as a building, in which wireless network access or GPS is unavailable, spotty, or unreliable. Each of the QR codes is encoded with information that indicates the location of the QR code, a link for downloading an off-line map if external wireless network connectivity may be available later or in other locations within the area, and map data for the area.

A user may scan the QR code with their wireless device, such as a smart phone, and use the information encoded in the QR code to create a map of the area and indicate the user's location within the area. The user may locate the point of interest on the map to which they would like to go and use the map to navigate to the desired destination. In some embodiments, various parts of the map may be selectable by the user, when displayed on the user's device, and selection of a particular area on the map will cause the device to display directions from the user's current location to the destination. The directions may include a graphic, such as lines and arrows on the map, to indicate where to travel and/or text which provides detailed instructions for navigating to the desired destination.

Measurements from sensors within the user's device, such as gyroscopes, accelerometers etc., are used to help navigate and determine the user's location on the map as the user travels through the area. The device may use the user's stride data or user stride information that has previously been obtained to determine where the user is located. In other embodiments, the device may estimate the user's stride data and update the user's stride data when the user comes to and scans another QR code in the area. The user's stride data may be updated based on the difference in location between the two QR codes. The user's stride data may also be updated based on the time it took the user to travel from the location of the first QR code to the location of the second QR code. In an embodiment, all the information necessary to determine the user's location and determine directions to a desired location are encoded in the QR code. Each scan of the QR code will be used to adjust the user's stride data and his/her real-time location for navigation. In an embodiment, the user's height and weight information will be used to calculate his/her general average stride. The user's real-time location information will be determined by his stride and steps since the navigation started.

QR codes that contain the location where this QR code is pasted, the link for downloading an off-line map if internet is available, and also the brief map data of the very area, such as a building, will be pasted in the specific places of the area. Of course, if the user can connect to the Internet when they scan the QR code, then a more detailed off-line map can be downloaded for completed rendering in the selected navigation application.

In an embodiment, for navigation, existing sensors in the user's device, such as a gyroscope, are used to aid in navigation. In an embodiment, the device will instruct the user to try some steps toward a certain direction and then turn to another direction and walk some steps to aid in determining the user's orientation.

In an embodiment, steps tracked by the existing sensors in a user's mobile phone and time spent between two times of scans of the QR codes located at two different locations are used to calculate the user's stride. Each scan of a QR code where multiple QR codes are placed around an environment, each with information identifying the particular location of the QR code as well as mapping information for the area, will be used to adjust the user's stride data and the user's real-time location for navigation. In an embodiment, a user's height and weight information is used to calculate the user's general average stride. In an embodiment, the user's real-time location information is determined by the user's stride and steps since the navigation was started.

With reference now to the Figures and, in particular, with reference to FIG. 1, a diagram of an environment 100, in which a user needs directions to a location within a building, is depicted in accordance with an illustrative embodiment. Environment 100 is an environment (e.g., building interior, a park, a group of buildings) with which a user 102 is unfamiliar and needs assistance in navigating to a desired location. In an embodiment, environment 100 lacks a wireless network, wireless internet access, or GPS with which the user 102 may obtain location information and directions. In other embodiments, environment 100 includes a wireless network, wireless Internet access, or GPS, but maps of the environment 100 are not generally available to the public, or the user 102 is unfamiliar with how to obtain such maps. In an embodiment, environment 100 is the interior of a building. In other embodiments, environment 100 is outside and includes multiple buildings and may also include the interiors of each of the multiple buildings. In yet other embodiments, environment 100 is outside in an area such as a park.

Environment 100 includes a graphical indicator 108 placed on a surface 104 such as a wall, column, tree trunk, etc. In an embodiment, the graphical indicator 108 is a matrix barcode or a two-dimensional barcode, such as, for example, a QR code. A QR code uses four standardized encoding modes (numeric, alphanumeric, byte/binary, and kanji) to store data efficiently. In an embodiment, a QR code consists of black squares arranged in a square grid on a white background which can be read by an imaging device such as a camera and interpreted by a data processing system using, for example, Reed-Solomon error correction.

In an embodiment, a sign 106 identifies that the graphical indicator 108 is nearby and that the graphical indicator 108 includes location and mapping information for the environment 100. The user 102 uses a user equipment (UE) 110 (e.g., a smart phone or other wireless electronic device) to scan the graphical indicator 108 to obtain location and mapping information. The UE 110 presents the map and location to the user on a display. The UE 110 may also show a desired destination as determined by the user 102 with directions on how to navigate to the desired destination from the current location using the mapping and location information obtained from the graphical indicator 108. The UE 110 uses measurements from sensors (such as a gyroscope, accelerometer, and a magnetometer) and estimates of user stride length to keep the current location of the user 102 up to date as the user 102 walks through the environment 100 to the desired location. A sensor measurement may determine, for example, a number of steps and/or a direction a user is moving. The UE 110 may estimate the user stride length based on information stored in the UE 110 such as height and weight or may obtain user stride length from other means.

The environment 100 may include multiple graphical indicia 108 located at various places within the environment, each storing mapping information and location information related to the location in which the particular graphical indicia 108 is located. As the user 102 navigates through the environment, the user 102 may scan multiple graphical indicia 108 to help in keeping the current location of the user 102 up to date and accurate. The UE 110 may also update user stride data based on the distance between two graphical indicia 108 within the environment 100 and also possibly on the time it took to walk between the two graphical indicia 108 within the environment.

The graphical indicator 108 provides the UE 110 with location and mapping information without the UE 110 accessing a network or the Internet. In an embodiment, the graphical indicator 108 also provides a link to a network or Internet location where more detailed mapping and location information than is provided by the mapping and location information encoded in the graphical indicator may be obtained. The UE 110 may use the link if network or Internet access is later obtained. This may be useful, for example, in situations in which a wireless signal strength to a Wi-Fi or cellular network varies and is not consistent or in which the wireless signal strength is patchy and not available at all locations within the environment 100.

Figure 2:
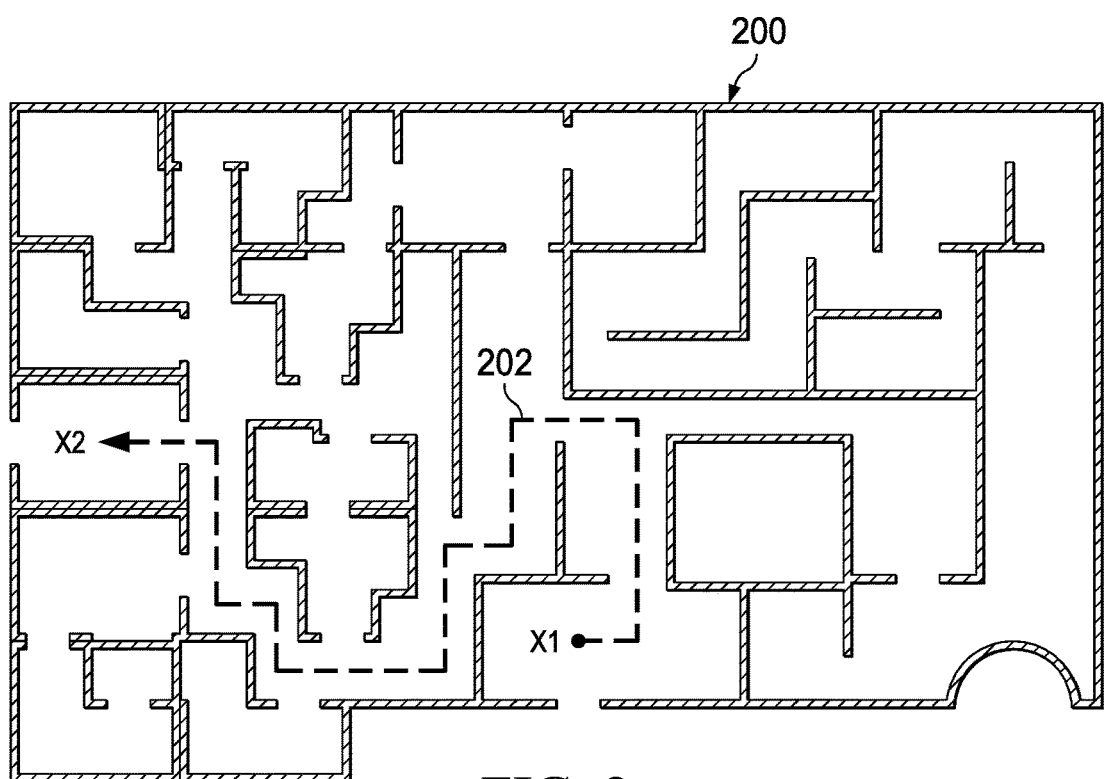
FIG. 2, a display of a map with directions that is displayed on a user's device is depicted in accordance with an illustrative embodiment.

Turning now to FIG. 2, a display of a map 200 with directions that is displayed on a user's device is depicted in accordance with an illustrative embodiment. Map 200 shows a building with multiple rooms and a maze-like path between rooms. The map 200 also shows a path 202 from a user's current location X1 to a user's intended destination X2. As the user walks through the environment depicted by the map 200, the user's location is updated and displayed on the map 200. If the user strays from the path 202, the map is updated to show the user's current location and a new path to the intended destination X2. In an embodiment, map 200 is displayed on UE 110 shown in FIG. 1.

In an embodiment, the user's current location X1 is updated based on a user's average stride and based on sensor data from the UE displaying the map 200. In an embodiment, the user's average stride is obtained from existing data of other similar step counting or sporting software to suggest specific steps for the user to reach a certain distance. If no such data is available, an average or estimated stride may be used. The average stride may be determined based on the user's height and weight as provided by the user or according to a default stride length which is used until more accurate data is obtained.

To obtain more accurate data, the UE takes advantage of the two times of scans of the graphical indicators at two different locations within an environment and also the steps counted by the sensors, such as a gyroscope, to calculate the user's stride. If the deviation between the average stride and the user's latest calculated stride falls into the proper range, the new calculated stride will be used for navigation.

In an embodiment, if the time spent between the two scans of the graphical indicators at the two different locations exceeds a reasonable scope, the steps between these two scans will be skipped during calculating the user's stride.

In an embodiment, the user's real-time location information is determined by the user's stride and steps since the navigation started. Once the user starts the navigation, the user's real-time location will be labeled in the map 200 by aid of the user's steps that happen when following the navigation.

Figure 3:
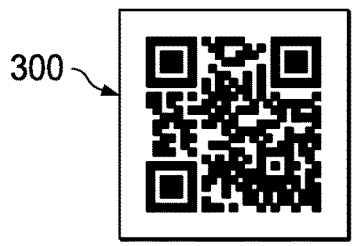
FIG. 3 is a graph of a QR code in accordance with an illustrative embodiment.

Turning now to FIG. 3, a graph of a QR code 300 is depicted in accordance with an illustrative embodiment. QR code 300 is an example of a graphical indicator that may be used as graphical indicator 108 shown in FIG. 1. The QR code 300 can be used to encode the mapping and location information of environment 100 depicted in FIG. 1. The map data may be encoded into the QR by, for example, dividing each floor of a building (if the building has multiple floors) into many small areas. For example, each area can be just one square meter or smaller. In this manner, each floor is abstracted into a two-dimensional matrix and the whole building is abstracted into a three-dimensional matrix.

At each floor, each small area indicates a specific location, that is, a corner tag, similar to the corner marker of a two-dimensional array. Each small area has its properties. For example, if a small area is a wall or unreachable place, it is tagged as 0. If the small area is a road or path, it is tagged as 1. Some small areas represent specific locations, such as the entrance to a supermarket, the exit of a garage, a store, or a playground. For example, in an embodiment, the following is a space: (10×10).

Following is an example of the coding of a QR code for a building:
−3
0,0
0100000000
0100000000
0111111110
0000000010
0000000010
0000000010
0000011000
0000010000
0000010000
0000010000
10,10
(6,10) supermarket entrance
(3,3) fruit shop
(2,2) parking space 02

The data is then flattened to: −3(10,10)(0,0) 01000000001000000000111111 11100000000010000000001000000000100000011000000 001000000000100000000100 00 (6,10) supermarket entrance (3,3) fruit shop (2,2) parking space 02. The first character (i.e., −3) represents the located floor (e.g., the third floor), the second bracket (i.e., (10,10)) is the size of the matrix, and the third bracket (i.e., (0,0)) is the current position. The rest of the data is the brief map data of the building. With compression, the data becomes: −3(10,10)(0,0)119199919191628191914(6,10)supermarket entrance (3,3) fruit shop (2,2) parking space 02. The generated QR code 300 is shown in FIG. 3.

Figure 4:
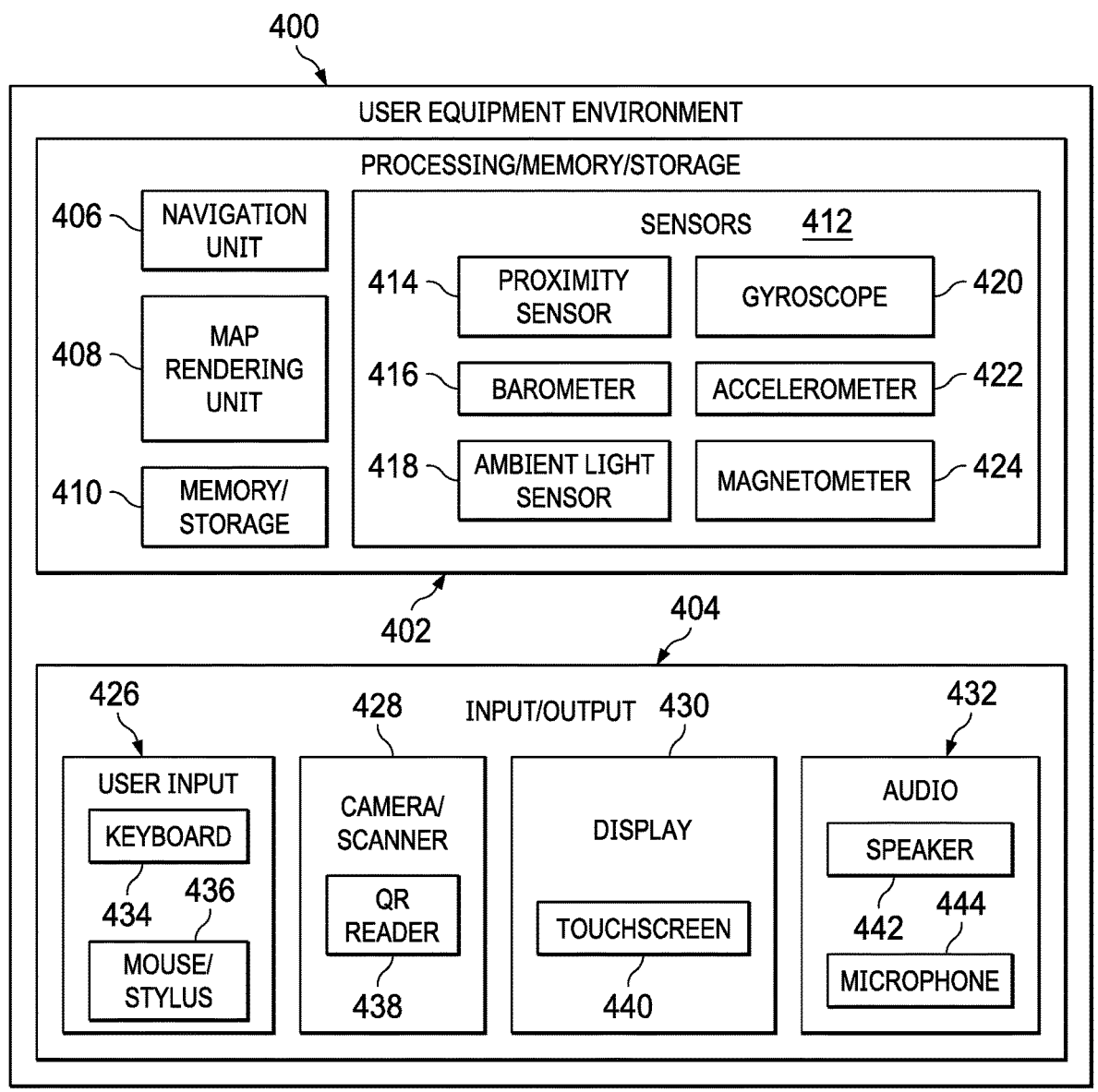
FIG. 4 is a block diagram of a user equipment (UE) environment in accordance with an illustrative embodiment.

With reference now to FIG. 4, a block diagram of a user equipment (UE) environment is depicted in accordance with an illustrative embodiment. In this illustrative example, UE environment 400 includes components that can be implemented in hardware such as the hardware shown in network data processing system 700 in FIG. 7 described below, or in data processing system 800 in FIG. 8, also described below. UE environment 400 may include more or fewer components than shown in FIG. 4. Additionally, in some embodiments, some functions described as performed by a single component below may be performed by multiple components or by different components than those described.

UE environment 400 may be implemented in UE 110 depicted in FIG. 1. UE environment 400 includes processing/memory/storage 402 and input/output (I/O) 404. Processing/memory/storage 402 includes a navigation unit 406, a map rendering unit 408, memory/storage 410, and sensors 412. Sensors 412 includes a proximity sensor 414, a barometer 416, an ambient light sensor 418, a gyroscope 420, an accelerometer 422, and a magnetometer 424. In other embodiments, sensors 412 may include other sensors not shown or may include fewer sensors than shown. The sensors 412 may measure or be used to determine, for example, a number of steps taken by the user and/or a direction of travel of the user. The I/O 404 includes user input 426, camera/scanner 428, display 430, and audio 432. The user input 426 includes a keyboard 434 and a mouse/stylus 436. The camera/scanner 428 includes a QR reader 438. The display 430 includes a touchscreen 440. The audio 432 includes a speaker 442 and a microphone 444. In an embodiment, the keyboard 434 is not a physical keyboard, but is implemented as a touchscreen keyboard on touchscreen 440. In an embodiment, the user uses their finger or the stylus 436 to manipulate touchscreen 440. The user may also use the microphone 444 to enter requests and data into the UE environment 400.

The QR reader 438 is used to read a QR code that is encoded with mapping and location information for a particular area. For example, QR reader 438 may read QR code 300 shown in FIG. 3. The navigation unit 406 obtains the data from the QR code read by the QR reader 438 and determines a current location and a map of the area. This information may be stored in memory/storage 410. The map rendering unit 408 generates or renders a map based on the data determined by the navigation unit 406, such as map 200 depicted in FIG. 2, to display to the user and displays the map on display 430. The navigation unit 406 determines a path to the desired location based on user input and the location and mapping information obtained from the QR code. The path is rendered by the map rendering unit 408 and displayed on display 430. The navigation unit 406 uses user stride data and information from the sensors 412 to determine a user's updated current location (i.e., updated user location). In an embodiment, the updated user location is a sensor updated user location determined according to a sensor measurement obtained by a sensor 412 in the UE environment 400. The updated current location is used by the map rendering unit 408 to create and display an updated map on the display 430. The navigation unit 406 updates user stride data based on steps taken to reach a second QR code, a scan of the second QR code to determine a new current location, and the time it takes the user to reach a second QR code. This updated stride data is used to calculate a revised path from the user's new current location to the desired destination location. In addition to, or in place of displaying a map, the navigation unit 406 may generate audible instructions and project them through speaker 442. The navigation unit 406 may also generate textual instructions for navigating to the desired destination location and present the textual instructions to the user through display 430.

Some or all of UE environment 400 may be implemented in software, hardware, firmware or a combination thereof. When software is used, the operations performed by UE environment 400 may be implemented in program code configured to run on hardware, such as a processor unit. When firmware is used, the operations performed by UE environment 400 may be implemented in program code and data and stored in persistent memory to run on a processor unit. When hardware is employed, the hardware may include circuits that operate to perform the operations in UE environment 400.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

UE environment 400 is a physical hardware system and includes one or more data processing systems. When more than one data processing system is present in UE environment 400, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with determining a location of the user when a network or Internet connection is unavailable or when a user does not know how and/or where to obtain a map of an area. As a result, one or more technical solutions may provide a technical effect of providing a user with a current location and a map and navigation instructions for navigating to a desired location without the assistance of a network or Internet connection.

As a result, UE environment 400 operates as a special purpose computer system in which navigation unit 406, map rendering unit 408, and QR reader 438 in UE environment 400 enables determining a location of the user within an environment without the assistance of a network or Internet connection. In addition, navigation unit 406, map rendering unit 408, and QR reader 438 in UE environment 400 provide the user with a map and navigation instructions to a desired destination within an environment without the assistance of a network or Internet connection In particular, navigation unit 406, map rendering unit 408, and QR reader 438 transform UE environment 400 into a special purpose computer system as compared to currently available general computer systems that do not have navigation unit 406, map rendering unit 408, and QR reader 438.

UE environment 400 performs a transformation of data from the data encoded in the QR code to data presentable to the user for mapping and navigation such that the data has a different function or has a different use.

The illustration of UE environment 400 in FIG. 4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
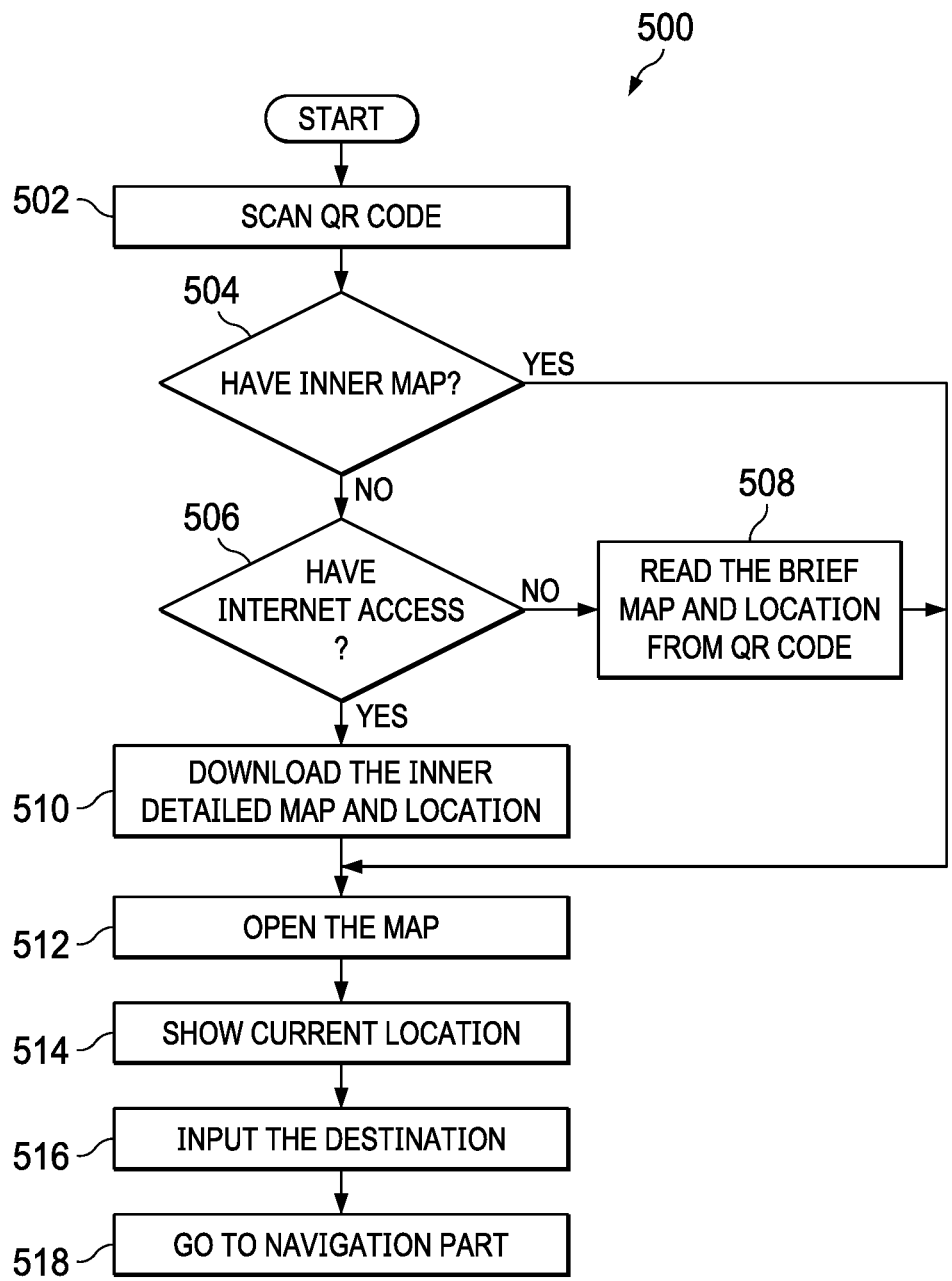
FIG. 5 is a flowchart of a process for obtaining location and mapping information from a graphical indicator posted on a surface in an environment in accordance with an illustrative embodiment.

Turning next to FIG. 5, a flowchart of a process 500 for obtaining location and mapping information from a graphical indicator posted on a surface in an environment, such as environment 100 in FIG. 1, is depicted in accordance with an illustrative embodiment. The processes 500 in FIG. 5 can be implemented in hardware, software, or both. The processes 500 may be implemented, in a UE, for example, in UE environment 400 or UE 100. When implemented in software, the processes can take the form of program code that is run by one of more processor units located in one or more hardware devices in one or more computer systems. For example, these processes 500 can be implemented in component processing/memory/storage 402 and input/output 404 running on UE environment 400 in FIG. 4.

The process 500 begins by scanning a graphical indicator or QR code (step 502). Next, at block 504, the UE determines whether the UE already contains a map of the area (step 504). For example, the UE may have previously scanned a QR code in the building or area in which the user is attempting to navigate. In which case, the UE already has the map and does not need to download or obtain the map again. If the UE has the map of the area (e.g., inner map), the UE then opens the map (step 512). If the UE does not have the map, then the UE determines whether Internet access is available (step 506). If Internet access is available, then the UE downloads the inner detailed map and location from the Internet using a link obtained from the scan of the QR code (step 510) and then opens the map (step 512). If Internet access is not available, then the UE reads the brief map and location from the QR code (step 508) and then opens the map (step 512). Next, the UE shows the current location (step 514) and then receives input of the desired destination (step 516). Next, the UE proceeds to the navigation procedure (step 518) shown in FIG. 6 and described below.

Figure 6:
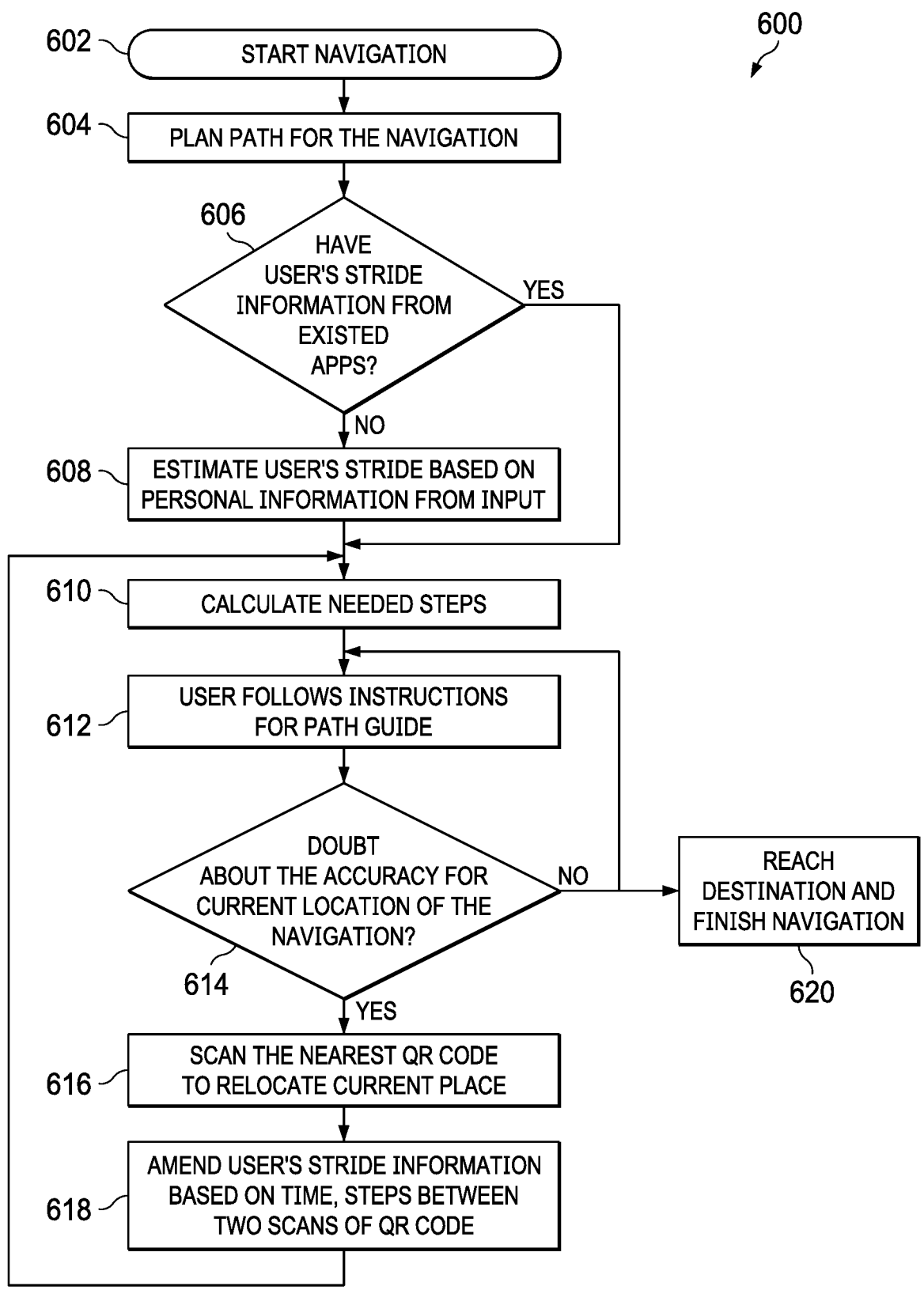
FIG. 6 is a flowchart of a process for navigating to a desired location based on the location and mapping information obtained from a graphical indicator posted on a surface in an environment in accordance with an illustrative embodiment.

Turning next to FIG. 6, a flowchart of a process 600 for navigating to a desired location based on the location and mapping information obtained from a graphical indicator posted on a surface in an environment, such as environment 100 in FIG. 1, is depicted in accordance with an illustrative embodiment. The processes 600 in FIG. 6 can be implemented in hardware, software, or both. The processes 600 may be implemented, in a UE, for example, in UE environment 400 or UE 100. When implemented in software, the processes can take the form of program code that is run by one or more processor units located in one or more hardware devices in one or more computer systems. For example, these processes 600 can be implemented in component processing/memory/storage 402 and input/output 404 running on UE environment 400 in FIG. 4.

The process 600 begins by starting the navigation (step 602) and then planning a path for the navigation based on the location and mapping information obtained from the QR code as described above with reference to FIG. 5 (step 604). Next, the UE determines whether it has the user's stride information from, for example, existing applications (step 606). If the UE does not have the user's stride information, the UE estimates the user's stride based on personal information from user input (step 608). Once the UE has obtained the user's stride information, the UE calculates the steps needed to arrive at the desired destination (step 610). Next, the user follows the instructions for the path guide (step 612). Next, the UE determines if there is doubt about the accuracy of the current location of the navigation (step 614). If there is doubt about the accuracy of the current location, then the user scans the nearest QR code with the UE to relocate the current place (step 616). Next, the UE amends the user's stride information based on, for example, time and steps between two scans of two different QR codes (step 618) and then the UE re-calculates the steps needed to arrive at the desired destination (step 610). If, at step 614, there is no doubt about the accuracy for the current location of the navigation, the process 600 proceeds back to step 612 where the user continues to follow the instructions for the path guide or the user reaches the destination and finishes navigation (step 620).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
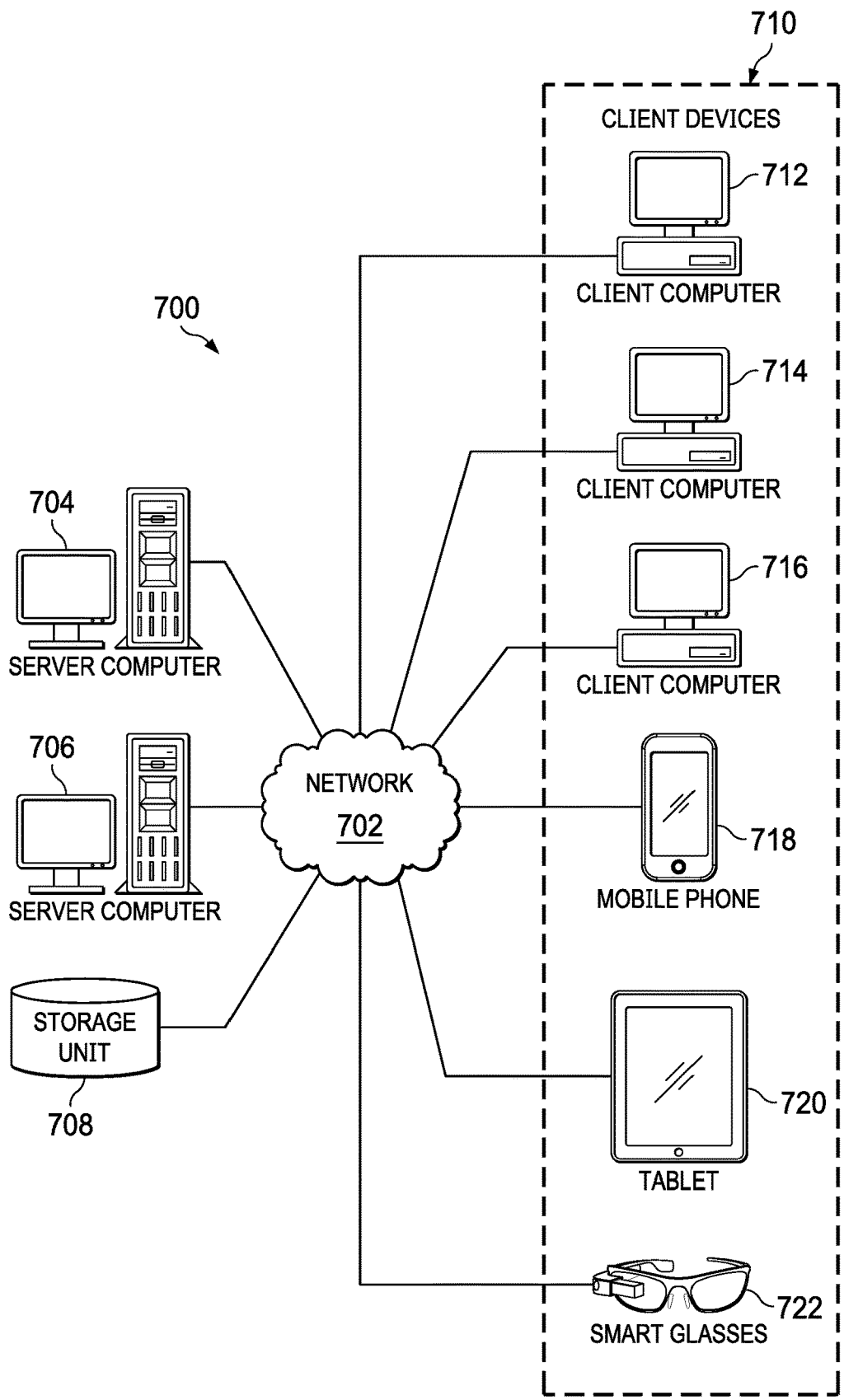
FIG. 7 is a pictorial representation of a network of data processing systems in which illustrative embodiments may be implemented.

Turning now to FIG. 7, a pictorial representation of a network of data processing systems is depicted in which illustrative embodiments may be implemented. Network data processing system 700 is a network of computers in which the illustrative embodiments may be implemented. Network data processing system 700 contains network 702, which is the medium used to provide communications links between various devices and computers connected together within network data processing system 700. Network 702 may include connections, such as wire, wireless communication links, or fiber optic cables.

In the depicted example, server computer 704 and server computer 706 connect to network 702 along with storage unit 708. In addition, client devices 710 connect to network 702. As depicted, client devices 710 include client computer 712, client computer 714, and client computer 716. Client devices 710 may be, for example, computers, workstations, or network computers. In the depicted example, server computer 704 provides information, such as enhanced mapping information to client devices 710, when network connectivity between the client devices 710 and the server computer 704 is available. The server computer 704 may also provide information, such as boot files, operating system images, and applications to client devices 710. Further, client devices 710 can also include other types of client devices such as mobile phone 718, tablet computer 720, and smart glasses 722. The mobile phone 718, tablet computer 720, and smart glasses 722 may be implemented as UE 110 in FIG. 1 or UE environment 400 in FIG. 4.

In this illustrative example, server computer 704, server computer 706, storage unit 708, and client devices 710 are network devices that connect to network 702 in which network 702 is the communications media for these network devices. Some or all of client devices 710 may form an Internet of things (IOT) in which these physical devices can connect to network 702 and exchange information with each other over network 702.

Client devices 710 are clients to server computer 704 in this example. Network data processing system 700 may include additional server computers, client computers, and other devices not shown. Client devices 710 connect to network 702 utilizing at least one of wired, optical fiber, or wireless connections.

Program code located in network data processing system 700 may be stored on a computer recordable storage medium and downloaded to a data processing system or other device for use. For example, program code may be stored on a computer recordable storage medium on server computer 704 and downloaded to client devices 710 over network 702 for use on client devices 710.

In the depicted example, network data processing system 700 is the Internet with network 702 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers consisting of thousands of commercial, governmental, educational, and other computer systems that route data and messages. Of course, network data processing system 700 also may be implemented using a number of different types of networks. For example, network 702 may be comprised of at least one of the Internet, an intranet, a local area network (LAN), a metropolitan area network (MAN), or a wide area network (WAN). FIG. 7 is intended as an example, and not as an architectural limitation for the different illustrative embodiments.

Figure 8:
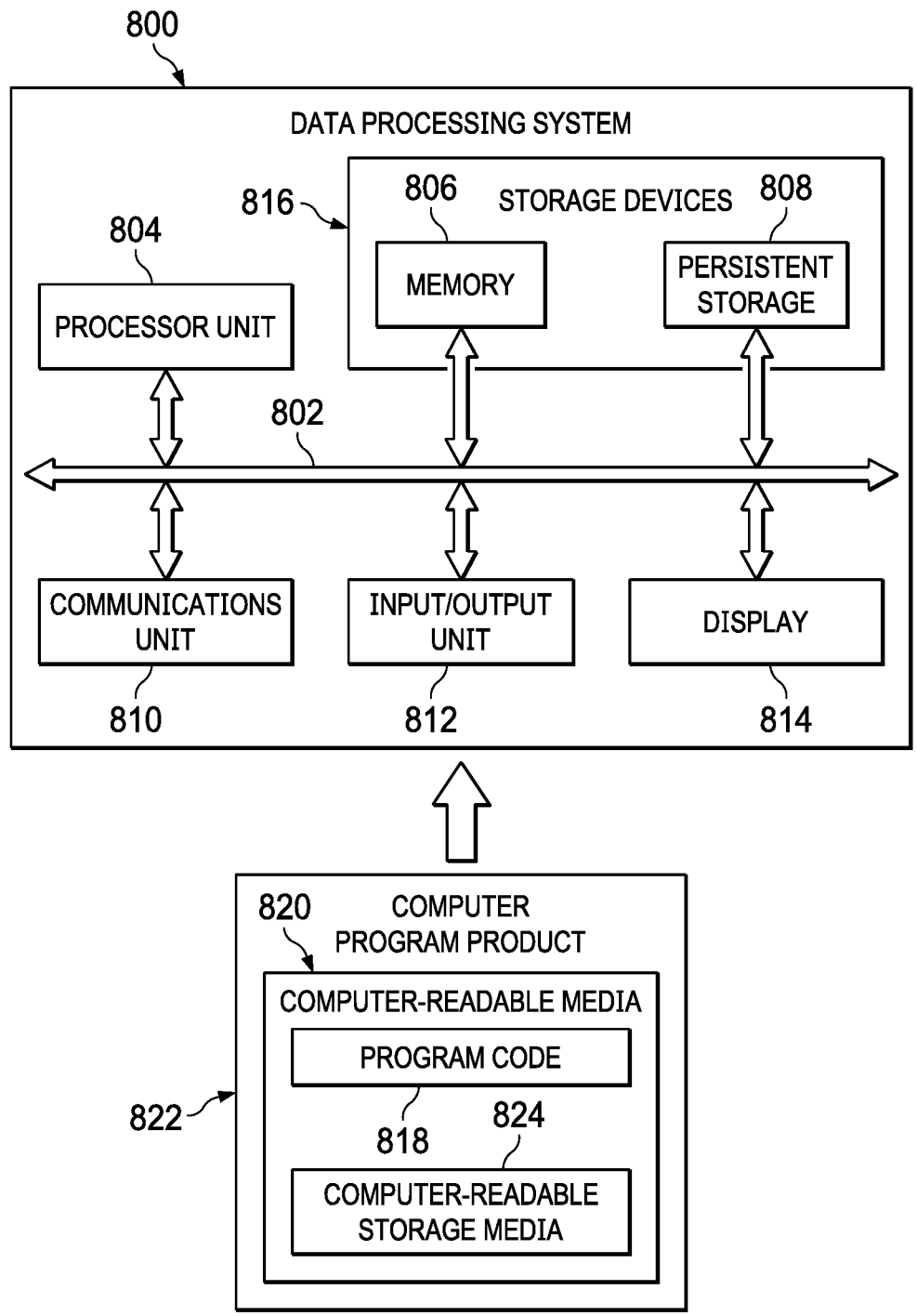
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement, UE 110, UE environment 400, server computer 704, server computer 706, and client devices 710. Data processing system 800 may be used to implement the methods illustrated in FIGS. 5 and 6. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid-state drive (SSD), a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, illustrative embodiments of the present invention provide a computer implemented method, computer system, and computer program product for providing location information and mapping information for an area to user without the aid of a network or Internet connection by the user. The disclosed methods can be widely applied into indoor stereolocation and navigation. However, although described primarily with reference to indoor locations and buildings, the disclosed methods, systems, and devices may be utilized outdoors and in contexts devoid of human constructed objects. The disclosed methods greatly improve the user experience by allowing the user to quickly determine their location and navigate easily to a desired destination despite the lack of a network or Internet connection. Furthermore, illustrative embodiments of the present invention provide a computer implemented method, computer system, and computer program product that eliminate the dependency on Internet or global positioning system (GPS) that common methods rely on, especially for making navigation underground possible where GPS does not work.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for determining a human user's location, the method comprising:
scanning, by a computer, an image of a first quick response code at a first location, the first quick response code located on a surface of an object in an area, and the first quick response code including mapping and location information encoded in the first quick response code;
determining, by the computer, a map and the human user's location on the map exclusively from the mapping and location information encoded in the first quick response code unaided by a network connection, an Internet connection, and a Global Positioning System where the map is interpretable by the human user; and
determining, by the computer, an updated human user's location on the map based on a stride length of the human user, wherein the computer determines the updated human user's location unaided by a network connection, an Internet connection, and a Global Positioning System,
wherein the stride length is initially determined as an average stride length based on height and weight of the human user.

2. The method of claim 1, further comprising:
rendering the map from the first quick response code, wherein the rendering of the map generates a graphical image of the map interpretable by the human user; and
presenting the map to the human user, wherein the map shows the human user's location.

3. The method of claim 1, wherein determining the updated human user's location further comprises:
determining the updated human user's location according to a measurement from a sensor in a user equipment (UE) of the human user.

4. The method of claim 3, wherein the sensor comprises one of an accelerometer, a gyroscope, a magnetometer, a barometer, a proximity sensor, and an ambient light sensor.

5. The method of claim 1, further comprising:
obtaining a second image of a second quick response code at a second location, the second quick response code including mapping and second location information encoded in the first quick response code; and
determining an updated human user's location according to the second quick response code.

6. The method of claim 5, further comprising:
updating the stride length of the human user according to the updated human user's location and a sensor updated user location, the sensor updated user location determined according to a sensor measurement obtained by a sensor in a user equipment (UE) of the human user.

7. The method of claim 1, further comprising:
determining directions from the human user's location to a destination location, the directions determined according to the first quick response code; and
presenting the directions from the human user's location to the destination location to the human user.

8. The method of claim 1 further comprising:
updating, by the computer, the stride length for the human user based on a number of steps taken by the human user and an elapsed time to reach a second quick response code located on a surface of an object in the area, wherein the second quick response code is at a different location than the first quick response code.

9. A computer for determining a human user's location unaided by a network connection, the computer comprising:
a processor; and
a computer readable storage medium storing program code which, when executed by the processor, performs a computer-implemented method of using the computer to determine human user's location unaided by a network connection, the program code comprising:
program code for obtaining an image of a first quick response code at a first location, the first quick response code located on a surface of an object in an area, and the first quick response code including mapping and location information encoded in the first quick response code;
program code for determining a map and the human user's location on the map exclusively from the mapping and location information encoded in the first quick response code unaided by a network connection, an Internet connection, and a Global Positioning System where the map is interpretable by the human user; and
program code for determining an updated human user's location on the map based on a stride length of the human user, wherein the program code for determining is unaided by a network connection, an Internet connection, and a Global Positioning System,
wherein the stride length is initially determined as an average stride length based on height and weight of the human user.

10. The computer of claim 9, wherein the program code further comprises:
program code for rendering the map from the first quick response code, wherein the rendering of the map generates a graphical image of the map interpretable by the human user; and
program code for presenting the map to the human user, wherein the map shows the human user's location.

11. The computer of claim 9, wherein the program code for determining the updated human user's location further comprises:
program code for determining the updated human user's location according to a measurement from a sensor in a user equipment (UE) of the human user.

12. The computer of claim 9, wherein the program code further comprises:
program code for obtaining a second image of a second quick response code at a second location, the second quick response code including mapping and second location information encoded in the second quick response code; and
program code for determining an updated human user's location according to the second quick response code.

13. The computer of claim 12, wherein the program code further comprises:
program code for updating the stride length for the human user according to the updated user location and a sensor updated user location, the sensor updated user location determined according to a sensor measurement obtained by a sensor in a user equipment (UE) of the human user.

14. The computer of claim 9, wherein the program code further comprises:
- program code for determining directions from the human user's location to a destination location, the directions determined according to the first quick response code; and
- program code for presenting the directions from the human user's location to the destination location to the user.

15. The computer of claim 9, wherein the program code for determining an updated human user's location further comprises:
- program code for updating the stride length for the human user based on a number of steps taken by the human user and an elapsed time elapsed to reach a second quick response code located on a surface of an object in the area, wherein the second quick response code is at a different location than the first quick response code.

16. A computer program product for determining a human user's location unaided a network connection, comprising:
- a computer readable storage medium storing program code which, when executed by a processor, causes the processor to perform a computer-implemented method to determine a human user's location unaided by a network connection, the program code comprising:
- program code for obtaining an image of a first quick response code at a first location, the first quick response code located on a surface of an object in an area, the first quick response code including mapping and location information encoded in the first quick response code;
- program code for determining a map and a human user's location on the map exclusively from the mapping and location information encoded in the first quick response code unaided by a network connection, an Internet connection, and a Global Positioning System where the map is interpretable by the human user; and
- program code for updating the human user's location on the map based on a stride length of the human user, wherein the update is unaided by a network connection, an Internet connection, and a Global Positioning System,
- wherein the stride length is initially determined as an average stride average based on height and weight of the human user.

17. The computer program product of claim 16, wherein the program code further comprises:
- program code for rendering the map from the first quick response code, wherein the rendering of the map generates a graphical image of the map interpretable by the human user; and
- program code for presenting the map to the human user, wherein the map shows the human user's location.

18. The computer program product of claim 16, wherein the program code for updating the human user's location further comprises:
- program code for determining an updated human user's location according to a measurement from a sensor in a user equipment (UE) of the human user.

19. The computer program product of claim 16, wherein the program code further comprises:
- program code for obtaining a second image of a second quick response code at a second location, the second quick response code including mapping and second location information encoded in the second quick response code; and
- program code for determining an updated human user's location according to the second quick response code.

20. The computer program product of claim 19, wherein the program code further comprises:
- program code for updating the stride length for the human user according to the updated user location and a sensor updated user location, the sensor updated user location determined according to a sensor measurement obtained by a sensor in a user equipment of the human user.

* * * * *